March 7, 1961 C. D. COCKBURN 2,974,289
MATRIX AMPLIFIER FOR COMBINING COLOR-DIFFERING SIGNALS
Filed Aug. 9, 1957
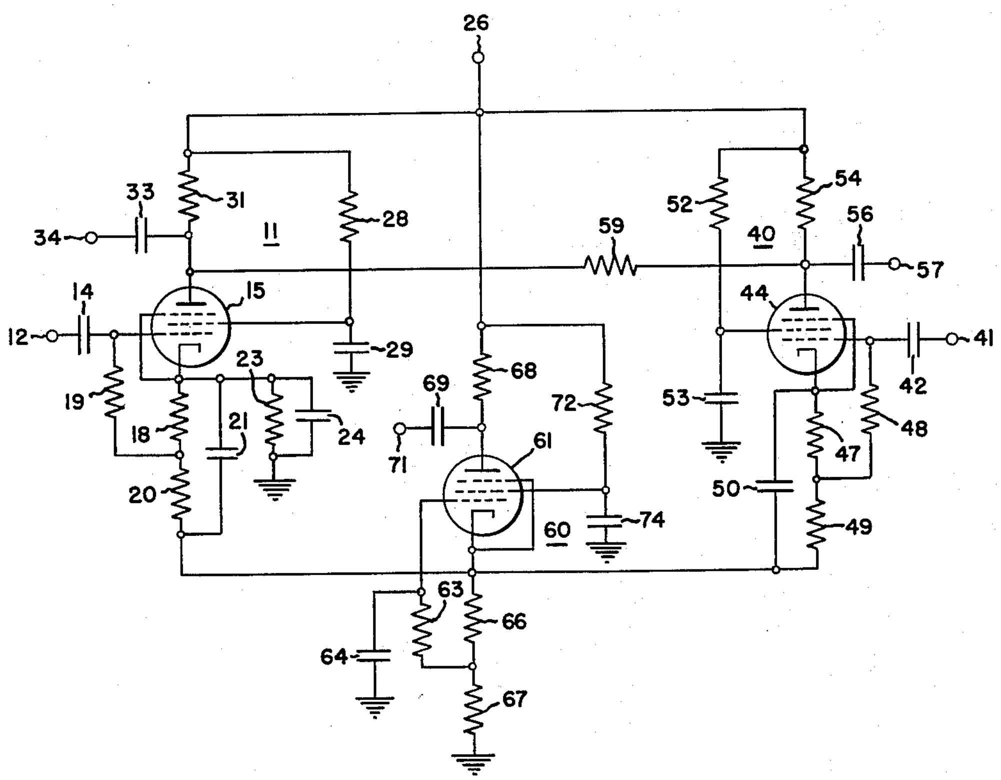
INVENTOR:
CURTIS D. COCKBURN,
BY Donald N. Timbie
HIS ATTORNEY.

United States Patent Office 2,974,289
Patented Mar. 7, 1961

2,974,289

MATRIX AMPLIFIER FOR COMBINING COLOR-DIFFERING SIGNALS

Curtis D. Cockburn, Frankfort, N.Y., assignor to General Electric Company, a corporation of New York Filed Aug. 9, 1957, Ser. No. 677,304
18 Claims. (Cl. 330—69)

The present invention relates to an improved circuit for matrixing two chroma signals to produce a third chroma signal.

As is well known in matrixing in color television receivers the $B-Y$ and $R-Y$ signals are combined in accordance with the following equation:

$$-(G-Y)=.18(B-Y)+.51(R-Y)$$

to produce a $G-Y$ signal which is the third color signal. The usual matrix comprises two electron tubes one of which is energized by the $B-Y$ signal and the other of which is energized by the $R-Y$ signal. The plates of these two tubes are joined through a resistor voltage dividing arrangement to the input of a third tube which is the $G-Y$ amplifier. The resistors in the voltage divider are of such values that a $G-Y$ signal appears at the plate of the $G-Y$ amplifier. The resistance of the voltage divider resistors must be of fairly large magnitude to prevent too much coupling between the $R-Y$ and $B-Y$ amplifier circuits. These large resistors in conjunction with the interelectrode capacitances of the $G-Y$ amplifier and the interwire capacitances of the circuit, produce a delay in the $G-Y$ signal with respect to the $R-Y$ and $B-Y$ signals. Consequently, the $R-Y$ and $B-Y$ signals have to be passed through delay circuits so that after the matrixing operation all three color signals are in phase. Of course it is desirable to eliminate the need for these delay circuits.

Accordingly, an object of the present invention is to provide a matrixing system in which there is no delay in the $G-Y$ signal.

Cross-talk occurs during matrixing due to the voltage generated across the impedances that are common to all the color circuits. By cross-talk I am referring to that part of the $R-Y$ signal coupled into the $B-Y$ amplifier circuit and that part of the $B-Y$ signal coupled into the $R-Y$ amplifier circuit. This cross-talk produces color distortion and thus should be cancelled if possible. One of the ways of cancelling cross-talk is by the introduction of a correction signal that is similar to the cross-talk signal except that it is of opposite polarity. The correction and cross-talk signals in the $R-Y$ and $B-Y$ amplifier circuits then cancel leaving only the pure chroma signals. With some matrixing circuits the introduction of this correction signal requires additional tubes. It would be advantageous to have a matrixing circuit in which no tubes were required to provide cross-talk cancellation.

Thus, another object of the present invention is to provide a matrix in which cross-talk can be cancelled cheaply and simply.

The input of a color television tube has a relatively large shunt capacitance reactance at high frequencies. This shunt reactance produces severe attenuation of the high frequencies of the video signal. Of course it is desirable to compensate for this attenuation.

Another object of the present invention is to provide a matrixing circuit that provides high frequency compensation to compensate for attenuation of the high frequency components of the video signal.

The above objects and advantages are obtained in one form of my invention in which a $B-Y$ amplifier, $R-Y$ amplifier and also a $G-Y$ amplifier are provided. The input of the $G-Y$ amplifier is coupled to the cathode circuits of the $B-Y$ and $R-Y$ amplifiers. The impedances in these cathode circuits are selected to be low in magnitude so that they produce very little delay of the $G-Y$ signal. Cathode degeneration is used in the $B-Y$ and $R-Y$ amplifiers to obtain the desired band width. That is, for low frequency signals there are impedances in the cathode circuits that provide degeneration. But at high frequencies these impedances are bypassed so that there is no degeneration of the high frequency signals with the result that the high frequency signals are amplified more than the low frequency signals. The circuit arrangement is such that the bypassing of the high frequency signals in the $B-Y$ and $R-Y$ amplifiers results in a greater input to the $G-Y$ amplifier for these signals. With a greater input, of course there is a greater output. Thus, the increased amplification in the $B-Y$ and $R-Y$ amplifiers and the greater output from the $G-Y$ amplifier for the high frequency signals compensate for subsequent attenuation. The design of the matrix is such that a simple resistor can be connected between the plates of the $R-Y$ and $B-Y$ amplifiers to provide coupling between the two circuits so that correction signals obtained from this coupling cancel the cross-talk signals produced during the matrixing operation.

The features of my invention that I believe to be novel are set forth with particularity in the appended claims. My invention itself, however, both as to its organization and method of operation, together with further objects and advantages thereof, may best be understood by reference to the following description taken in connection with the accompanying drawing, in which:

The figure is a circuit diagram of a preferred matrix embodiment of the present invention.

In the circuit of the figure there is an amplifier 11 for amplifying the $B-Y$ output of the synchronous detector (not shown) of a color television receiver. This amplifier includes an input terminal 12 coupled through a D.C. blocking capacitor 14 to the input of an electron discharge device 15 here shown to be a pentode tube. The type of electron discharge device employed in the matrix is not critical. For example, a tube with different elements or another device that is not a tube but that can amplify, e.g. a transistor, can be used. A resistor 18 is connected in the cathode circuit. Across this resistor there is developed a D.C. voltage corresponding to the D.C. tube current flow and an A.C. voltage corresponding to the A.C. tube current flow. Means are provided to couple the D.C. voltage developed across resistor 18 to the input of tube 15. As shown this means is a resistor 19 connected between an end of resistor 18 and the grid of tube 15. This resistor is not very effective for coupling the A.C. voltages from resistor 18 because, as will be shown, there is another path of much lower impedance for these A.C. voltages. Another resistor 20 is provided in the cathode circuit of tube 15 to limit the current flow. Resistor 18, the size of which depends upon the required bias, is not large enough for the impedance desired in the cathode circuit and thus resistor 20 must also be inserted. More will be said below about the required size of the cathode impedance. A capacitor 21 is coupled in parallel with resistors 18 and 20. This capacitor has a fairly small value so that it has no effect at low frequencies of the input signal applied at terminal 12. Only at high frequencies does this capacitor provide a low reactance in shunt with resistors 18 and 20. The combined effect of capacitor 21 and resistors 18 and 20 is that of a frequency sensitive impedance having a low frequency value approximately equal to the sum of the resistances of resistors 18 and 20 and having a high frequency value approximately equal to the reactance of capacitor 21. The reason for these two different values is that the reactance of capacitor 21 is very large at low frequencies and very small at high frequencies as compared to the combined resistance of resistors 18 and 20. There is another current path to the cathode of tube 15 through a resistor 23 joined in parallel with a capacitor 24. For color television applications, resistor 23 should be made low in value so that most of the current for tube 15 flows through it. More will be said below about what the value of resistor 23 should be in relation to the values of resistors 18 and 20 to produce the desired current flow. The value of capacitor 24 is selected so that at high frequencies it has a reactance that is very low and at low frequencies a reactance that is very high as compared to the resistance of resistor 23. The plate supply for tube 15 is obtained from a source (not shown) connected to a terminal 26. Screen grid voltage is coupled by a resistor 28 connected between terminal 26 and the screen grid of tube 15. A capacitor 29 is joined between the screen grid and ground to smooth any variations that would otherwise be present in the screen grid voltage. The output from amplifier 11 is produced across a resistor 31 connected between terminal 26 and the plate of tube 15. This output is coupled through a D.C. blocking capacitor 33 to an output terminal 34.

An amplifier 40 is provided to amplify the $R-Y$ output of the synchronous detector (not shown). The input terminal 41 to this amplifier is coupled through a D.C. blocking capacitor 42 to the input of an electron discharge device 44 here shown to be a pentode. The circuit components for tube 44 are similar in type, although not in magnitude, to those previously mentioned for tube 15. There is: a resistor 47 across which the bias voltage is developed, a resistor 48 for coupling the bias voltage developed across resistor 47 to the input of tube 44, a resistor 49 for providing sufficient impedance in the cathode circuit, and a high frequency bypass capacitor 50 connected in parallel with resistors 47 and 49. Also, there is a screen grid voltage dropping resistor 52 and a screen grid voltage smoothing capacitor 53. The output for amplifier 40 is developed across a resistor 54 connected in the plate circuit of tube 44. This output is coupled through a D.C. blocking capacitor 56 to an output terminal 57. It should be noted that there is one current path in the cathode circuit of tube 44 as contrasted to the two current paths in the cathode circuit of tube 15. The significance of this is explained below. As will be discussed below, in order to cancel cross-talk a portion of the output of amplifier 40 should be coupled into amplifier 11 and likewise a portion of the output of amplifier 11 should be coupled into amplifier 40. The means for doing this coupling is shown to be a resistor 59 connected between the plates of tubes 15 and 44.

An amplifier 60 is provided to amplify the $G-Y$ component of the color signal. This amplifier includes an electron discharge device 61 that is here shown to be a pentode. A resistor 63 is inserted between the grid of tube 61 and a point in the cathode circuit to provide a D.C. return path for the grid current. A capacitor 64 A.C. couples the grid of tube 61 to ground. Consequently, amplifier 60 is a grounded-grid amplifier. A resistor 66 is connected in the cathode circuit of tube 61 so that the voltage developed across it is the bias voltage for the tube. Another resistor 67 is also connected in the cathode circuit to provide sufficient cathode impedance. The value of resistor 66 is limited by bias requirements and thus circuit requirements may necessitate the insertion of resistor 67. Another way of considering resistors 66 and 67 and also resistors 18 and 20 of amplifier 11 and resistors 47 and 49 of amplifier 40 is as voltage dividing arrangements for providing the correct grid voltages of tubes 61, 15, and 44, respectively. Of course each pair of these resistors could be replaced by a potentiometer. In the circuit of amplifier 60 the output is generated across a resistor 68 connected between terminal 26 and the plate of tube 61. A D.C. blocking capacitor 69 couples the plate of tube 61 to an output terminal 71. A voltage dropping resistor 72 is joined between terminal 26 and the screen grid of tube 61. An A.C. bypass capacitor 74 is connected between the screen grid and ground to bypass any A.C. voltage components that may be present in the screen grid voltage.

As previously mentioned, in color television systems the $G-Y$ signal is obtained from the $B-Y$ signal and $R-Y$ signal in accordance with the following equation:

$$-(G-Y=.18(B-Y)+.51(R-Y)$$

It is evident from this equation that very little $B-Y$ signal is required although a great deal of $R-Y$ signal is necessary to produce the $G-Y$ signal. The introduction of the required $B-Y$ signal into the $G-Y$ amplifier circuit 60 is as follows: When the $B-Y$ signal is applied to the grid of tube 15 it produces a varying $B-Y$ current through this tube. Only a portion of this current flows through the path comprising resistors 18 and 20 and capacitor 21. The remaining portion flows through resistor 23 and capacitor 24. The $B-Y$ current flowing through resistors 18 and 20 also flows through resistors 66 and 67 of tube 61 and therein produces a change in voltage between the cathode and the grid. This voltage is amplified by tube 61 in the conventional manner. In this way, the $B-Y$ portion of the $G-Y$ signal, as required by the above equation, is produced in the output of the $G-Y$ amplifier 60. The values of resistors 18 and 20 and also resistor 23 in the circuit of tube 15 and resistors 66 and 67 of the circuit of tube 61 are such that the correct proportion of $B-Y$ signal is generated in the $G-Y$ circuit. Since very little $B-Y$ signal is needed for the $G-Y$ amplifier, as the above equation readily illustrates, only very little of the $B-Y$ current flows through resistors 66 and 67 of amplifier 60. The remainder of the current, required for sufficient output from tube 15, flows through the shunt path comprising the parallel combination of resistor 23 and capacitor 24.

In a similar fashion the $R-Y$ signal applied to terminal 41 produces a varying $R-Y$ current through tube 44. All of this current flows through resistors 66 and 67 of the $G-Y$ amplifier. The variations in the current produce variations in voltage across these resistors, which variations are amplified by tube 61. In this manner the required $R-Y$ signals are interjected into the output of the $G-Y$ amplifier circuit 60. Because a large amount of $R-Y$ signal is needed for the $G-Y$ signal, all of the $R-Y$ current can flow through resistor 66 and 67 and no shunt path need be provided. Resistors 66, 67, 47, 49 and 54 determine the magnitude of $R-Y$ current flow.

Due to the fact that the resistors 18, 20, 66, 67, 47, and 49 in this embodiment are of a very low magnitude there is very little delay in the $G-Y$ signal. Thus, there is no need for circuits for delaying the $R-Y$ and $B-Y$ signals after the matrixing operation.

At low frequencies the reactance of shunt capacitors 21 and 24 are very high and thus they do not provide bypass actions. Consequently, at these frequencies sizable voltages are developed across resistors 18, 20, and 23. It may not be apparent, but these voltages have a degenerative effect upon the amplification of amplifier 11 because they are coupled between the cathode and grid of tube 15. The A.C. voltages developed across resistors 18 and 20 are coupled to ground through resistors 66 and 67 of amplifier 60, and through ground to the output impedance of the synchronous detector (not through this output imedance and through capacitor 14 shown) joined to terminal 12. They are then coupled through this output impedance and through capacitor 14 to the grid of tube 15. Because the impedance of this path is much lower than the resistance of resistor 19, this resistor has no appreciable coupling effect for these A.C. voltages. The voltage developed across resistor 23 is coupled directly to ground, but otherwise the coupling path for this voltage is the same as for the voltages developed across resistors 18 and 20.

In a similar manner, in the circuit of tube 44 the A.C. voltages generated across resistors 47 and 49 have a degenerative effect upon the low frequency *R—Y* signals because at low frequencies capacitor 50 does not have a bypass action.

The voltages developed across resistors 66 and 67 of amplifier 60 do not have a degenerative effect upon the amplification of tube 61 because it is these voltages that are the input to this tube. These voltages are coupled through capacitor 64 to the grid of tube 61 and thus are the input to amplifier 60. Therefore, although there is degenerative action in amplifiers 11 and 40 at low frequencies there is no such action in amplifier 60.

In amplifiers 11 and 40 at high frequencies, resistors 18 and 20 are bypassed by capacitor 21, resistor 23 is bypassed by capacitor 24, and resistors 47 and 49 are bypassed by capacitor 50. Consequently, there is very little degenerative action in tubes 15 and 44. The result is that the high frequency signals are amplified by these tubes more than the low frequency signals. The capacitors 21 and 50 in addition to a bypass action in tubes 15 and 44, respectively, also increase the amplitude of the signal applied at the cathode of tube 61. This is evident if it is realized that the series combination of resistors 31, 18, 20, 66, and 67 for tube 15 and the series combination of resistors 54, 47, 49, 66, and 67 for tube 44 both can be considered to be voltage dividing arrangements. If some of these resistors are decreased in value there, of course, is an increased voltage drop across each of the other resistors. In tube 15 at high frequencies, the bypass action of capacitor 21 produces the same result as if the resistors 18 and 20 were decreased in value. Consequently, at these frequencies, more of the *B—Y* voltage appears across resistors 66 and 67 at the input to tube 61. Capacitor 50 has a similar action in amplifier 40. Thus, more *R—Y* voltage appears at the input of tube 61 for the high frequencies than for the low. Consequently, there is an increased input of both *B—Y* and *R—Y* signals to tube 61 at the high frequencies. This increased input causes an increased output from amplifier 60 at the high frequencies as compared to the low frequencies. The relatively increased output from the matrix for the high frequencies by degeneration at the low frequencies in amplifiers 11 and 40 and at the high frequencies by an increased input to amplifier 60, compensates for the attenuation of the high frequency signals produced by the interwire capacitances and the input capacitance of the color television tube.

Due to the common impedance comprising resistors 66 and 67 in the cathode circuits of tubes 15 and 44; some *R—Y* signal is introduced into amplifier 11 and some *B—Y* signal is introduced into amplifier 40. These introduced signals, which are cross-talk, appear at output terminals 34 and 57 unless cancelled. Resistor 59 couples the necessary signals into the circuits of tubes 15 and 44 for cancelling this cross-talk. To understand this consider first the *R—Y* signal developed across resistor 66 and 67. This signal is in phase with the *R—Y* voltage applied at terminal 41 at the input of tube 44 because the grid voltage and plate current of tube 44 are in phase in the type of amplifier circuit shown. That is, as the grid, of tube 44 becomes more positive there is an increase of current through the tube and as the grid becomes more negative there is a decrease of current through the tube. This is evident from elementary electron considerations. Therefore, the *R—Y* signal that is developed across resistors 66 and 67 and coupled through resistors 18 and 20 to the cathode of tube 15 is in phase with the *R—Y* voltage applied at terminal 41. This voltage is amplified by tube 15 and appears at the plate without a change of phase. That is, tube 15 acts as a grounded-grid amplifier upon this voltage. As is well known, the voltage at the cathode of a grounded-grid amplifier appears amplified in phase at the plate. Thus, this *R—Y* signal that is to be cancelled at the plate of tube 15 is in phase with the *R—Y* voltage appearing at the input of terminal 41. As is evident from elementary amplifier technology, the voltage at the plate of tube 44 is out of phase with the voltage at terminal 41 and thus out of phase with the *R—Y* voltage at the plate of tube 15. Resistor 59 couples a portion of this out-of-phase *R—Y* voltage to the plate of tube 15. This coupled voltage cancels the in-phase voltage amplified by tube 15. Similarly, resistor 59 couples an out-of-phase *B—Y* voltage from tube 15 to cancel the *B—Y* signal appearing at the plate of tube 44. The magnitude of resistor 59 is selected so that the correct proportion of cancelling signals are coupled into the respective plate circuits.

In summary, a network has been disclosed that not only provides matrixing of two chroma signals, or the like, to produce a third chroma signal but it also provides high frequency compensation and simple and inexpensive cross-talk cancellation. Matrixing is done at very low impedance levels in the cathode circuits, or the like, of three amplifier circuits. At such low impedance levels none of the chroma signals is appreciably delayed. High frequency compensation is produced by an enhancing of the high frequencies through degeneration of the low frequencies in two of the three amplifier circuits and by an increased high frequency input to the third amplifier. The economical design of the present invention utilizes the same elements that produce low freqeuncy degenerative action in the two amplifier circuits for producing an increased high frequency input to the third amplifier circuit. In this network, cross-talk cancellation can be had through the insertion of a single resistor between two of the amplifiers.

Although the invention has been described by reference to a particular embodiment thereof, it will be understood that numerous modifications can be made by those skilled in the art without departing from the invention. I therefore aim in the appended claims to cover all such equivalent variations as come within the true spirit and scope of my invention.

What I claim as new and desire to secure by Letters Patent of the United States is:

1. A circuit for matrixing two color signals to produce a third color signal, said circuit comprising, a first amplifier having a tube therein for amplifying one color signal, a second amplifier having a tube therein for amplifying another color signal, an impedance connected to be common to the cathode circuits of the tubes of said first and second amplifiers, a third amplifier having an input connected to said impedance, an impedance connected between the plates of the tubes of said first and second amplifiers, a first resistor connected in the cathode circuit of the tube of said first amplifier, a capacitor connected in shunt with said first resistor for presenting a low impedance only at high frequencies, and means between the cathode circuit and grid circuit of the tube of said first amplifier for applying at least a portion of the direct current voltage developed across said first resistor between the cathode and grid circuits of said first amplifier.

2. The circuit as defined in claim 1 including a second resistor joined in the cathode circuit of the tube of said second amplifier, a capacitor connected in shunt with said second resistor for presenting a low impedance only at high frequencies, and a connection between the cathode circuit of the tube of said second amplifier and the grid whereby at least a portion of the voltage developed across said second resistor appears between the cathode and grid of the tube of said second amplifier.

3. A network for amplifying two input signals and for producing a third signal that is a composite of these two signals, said network comprising: a first amplifier for amplifying one of the two input signals, said first amplifier comprising a first tube having a plate, a grid, and a cathode; a terminal for connection to a positive terminal of a source of constant potential; a resistor joined between the plate of said first tube and said terminal; a first resistor and a second resistor joined in series between the cathode of said first tube and ground such that said first resistor is connected to the cathode; a capacitor connected to present, at high frequencies only, a low impedance path in shunt with said first resistor; a resistor connected between said first resistor and the grid of said first tube such that at least a portion of the D.C. voltage developed across said first resistor appears between the grid and cathode of said first tube; a third resistor joined between the cathode of said first tube and ground; and a capacitor connected in parallel with said third resistor for presenting a low impedance path at high frequencies only; a second amplifier for amplifying the other of the two input signals, said second amplifier comprising: a second tube having a plate, a grid, and a cathode; a resistor joined between said terminal and the plate of said second tube; a fourth resistor joined in series with said second resistor between the cathode of said second tube and ground such that said fourth resistor is connected to the cathode of said second tube; a capacitor connected to present a low impedance path at high frequencies only in shunt with said fourth resistor; and a resistor connected between said fourth resistor and the grid of said second tube such that at least a portion of the D.C. voltage developed across said fourth resistor appears between the grid and cathode of said second tube; and a third amplifier for amplifying signals appearing across said second resistor, said third amplifier comprising a third tube having a grid, a plate, and a cathode; an A.C. bypass capacitor joined between the grid of said third tube and ground; a connection between the cathode of said third tube and an end of said second resistor such that at least a portion of the signal across said third resistor appears between the cathode and grid of said third tube; and a resistor joined between said terminal and the plate of said third tube.

4. The network as defined in claim 3 and a resistor coupled between the plates of said first and second tubes.

5. A network for amplifying the high frequency components of two input color signals more than the low frequency components and for matrixing the two input color signals to produce a third color signal, said network comprising: a first amplifier having a first electron discharge device for producing amplification of one of the two input color signals, a first frequency sensitive impedance connected so that at least a portion of the current flow through said first electron discharge device also flows through it, said first frequency sensitive impedance being such as to present a large impedance at low frequencies and a small impedance at high frequencies of the one input color signal, and a second impedance connected so that at least a portion of the current that flows through said first electron discharge device also flows through it; a second amplifier having a second electron discharge device for producing amplification of the other of the two input color signals, a second frequency sensitive impedance connected so that at least a portion of the current flow through said second electron discharge device also flows through it, said second frequency sensitive impedance being such as to present a large impedance at low frequencies and a small impedance at high frequencies of the other input color signal, and leads for connecting said second impedance into said second amplifier such that at least a portion of the current that flows through said second electron discharge device also flows through it; and a third amplifier connected to amplify the signal generated across said second impedance.

6. The network as defined in claim 5 wherein said second impedance is joined in series with said first frequency sensitive impedance and also in series with second frequency sensitive impedance.

7. The network as defined in claim 6 wherein said first frequency sensitive impedance comprises a resistor joined in parallel with a capacitor and wherein said second frequency sensitive impedance comprises a resistor joined in parallel with a capacitor.

8. The network as defined in claim 7 wherein said first, second, and third electron discharge devices are tubes, and wherein said first and second frequency sensitive impedances are connected, respectively, in the cathode circuits of the tubes of said first and second electron discharge devices.

9. The network as defined in claim 8 wherein said tube of said third amplifier is connected to said impedance such that the A.C. voltages generated across said second impedance appear between the grid and cathode of said tube of said third amplifier.

10. The network as defined in claim 9 wherein said third amplifier is connected as a grounded-grid amplifier.

11. The network as defined in claim 10 and a cross-talk cancelling device comprising first means for coupling a portion of the amplified one color signal from said first amplifier to said second amplifier and second means for coupling a portion of the amplified other color signal from said second amplifier to said first amplifier.

12. The network as defined in claim 11 wherein said first and second means for coupling comprise a resistor joined between the plates of the tubes of said first and second amplifiers.

13. A matrix network comprising: a first amplifier circuit having a first impedance path and a second impedance path connected in parallel, said first path including means for lowering the impedance of a part of said first path at high frequencies only, a second amplifier having an impedance path a portion of which is common with the portion of said first impedance path not including said part; and a third amplifier the input of which is connected across the common impedance portion of said first and second impedance paths, means for coupling a portion of the output of said first amplifier circuit into said second amplifier circuit and a portion of the output of said second amplifier circuit into said first amplifier circuit.

14. A circuit for matrixing first and second signals so as to derive a third signal comprising a first amplifier having a control grid to which the first signal may be applied, an anode and a cathode, a second amplifier having a control grid to which the second signal may be applied, an anode and a cathode, first and second impedances connected in series between said cathode of said first amplifier and ground, a third impedance connected between said cathode of said second amplifier and the junction between said first and second impedances, a fourth impedance connected in parallel with said first impedance, said fourth impedance having a higher value than said first impedance for low signal frequencies and a lower value for higher signal frequencies, a fifth impedance connected in parallel with said third impedance, said fifth impedance having a higher value than said third impedance for low signal frequencies and a lower value for higher signal frequencies, a third amplifier having a control grid, an anode and a cathode, means for coupling said latter cathode to said junction of said first, second and third impedances, means for grounding said latter grid for signal frequencies, load impedances connected to said anodes, and output leads connected to said anodes.

15. A circuit as set forth in claim 14 wherein an impedance is connected between the anode of said first amplifier and the anode of said second amplifier, said latter impedance having a value such that the amplitude of the signals coupled by said impedance from one anode to the other is equal to the amplitude of the cross talk signals produced thereat by virtue of said second impedance which is common to the cathode circuits of said first and second amplifiers.

16. A circuit as set forth in claim 14 wherein a sixth impedance is connected between said cathode of said first amplifier and ground, a seventh impedance is connected in parallel with said sixth impedance, said seventh impedance having a value greater than said sixth impedance for low signal frequencies and less for high signal frequencies.

17. A circuit as set forth in claim 14 wherein said first, second and third impedances are resistors and said fourth and fifth impedances are capacitors.

18. A matrix network comprising: a first amplifier circuit having a first impedance path and a second impedance path connected in parallel, said first path including means for lowering the impedance of a part of said first path at high frequencies only; a second amplifier having an impedance path a portion of which is common with the portion of said first impedance path not including said part; and a third amplifier the input of which is connected across the common impedance portion of said first and second impedance paths; and means for coupling a portion of the output of said first amplifier circuit into said second amplifier circuit and a portion of the output of said second amplifier circuit into said first amplifier circuit.

References Cited in the file of this patent

UNITED STATES PATENTS

| | | |
|---|---|---|
| 2,602,889 | Post | July 8, 1952 |
| 2,732,425 | Pritchard | Jan. 24, 1956 |
| 2,779,818 | Adder | Jan. 29, 1957 |
| 2,840,634 | Bedford | June 24, 1958 |
| 2,880,319 | Field | Mar. 31, 1959 |

OTHER REFERENCES

Design Techniques for Color Television Receivers, Electronics, February 1954, pages 136 to 144.